(12) United States Patent
Heberle et al.

(10) Patent No.: US 7,350,368 B2
(45) Date of Patent: Apr. 1, 2008

(54) STATIONARY VEHICLE AIR CONDITIONING SYSTEM

(75) Inventors: Arthur Heberle, Mannheim (DE); Marcus Weinbrenner, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 46 days.

(21) Appl. No.: 11/107,601

(22) Filed: Apr. 15, 2005

(65) Prior Publication Data

US 2006/0042285 A1 Mar. 2, 2006

(30) Foreign Application Priority Data

Sep. 1, 2004 (DE) ............... 10 2004 042 691

(51) Int. Cl.
*F25B 41/04* (2006.01)
(52) U.S. Cl. ............... 62/196.4; 62/183; 62/507
(58) Field of Classification Search ............... 62/236, 62/239–244, 196.4, 507–508, 133, 134, 179, 62/181, 183
See application file for complete search history.

(56) References Cited

U.S. PATENT DOCUMENTS

| | | | |
|---|---|---|---|
| 3,357,199 A * | 12/1967 | Harnish ............ | 62/181 |
| 3,390,539 A | 7/1968 | Miner | |
| 3,719,058 A | 3/1973 | Waygood | |
| 3,984,224 A * | 10/1976 | Dawkins ............ | 62/89 |
| 4,051,691 A * | 10/1977 | Dawkins ............ | 62/236 |
| 4,075,865 A | 2/1978 | Wills | |
| 4,134,274 A | 1/1979 | Johnsen | |
| 4,590,772 A | 5/1986 | Nose et al. | |
| 4,825,663 A * | 5/1989 | Nijjar et al. ............ | 62/236 |
| 4,873,837 A | 10/1989 | Murray | |
| 5,138,844 A | 8/1992 | Clanin et al. | |
| 5,205,130 A * | 4/1993 | Pannell ............ | 62/236 |
| 5,333,678 A | 8/1994 | Mellum et al. | |
| 5,385,030 A | 1/1995 | Kitagawa et al. | |
| 6,205,802 B1 * | 3/2001 | Drucker et al. ............ | 62/236 |
| 6,606,872 B1 | 8/2003 | Smith | |
| 6,932,148 B1 | 8/2005 | Brummett et al. | |
| 7,055,337 B2 | 6/2006 | Horn et al. | |
| 2006/0042284 A1 | 3/2006 | Heberle et al. | |
| 2006/0042286 A1 | 3/2006 | Heberle et al. | |

FOREIGN PATENT DOCUMENTS

DE 33 45 340 6/1985

(Continued)

OTHER PUBLICATIONS

European Search Report EP 05 01 6540.

*Primary Examiner*—William E. Tapolcai
(74) *Attorney, Agent, or Firm*—Leydig, Voit & Mayer, Ltd.

(57) ABSTRACT

The invention pertains to a stationary vehicle air conditioning system with a refrigerant circuit, in which at least one compressor circulates the refrigerant to at least two condensers. The at least one compressor may be powered by the vehicle's mechanical power, by an electrical source, or by a combination of these driving forces. Depending on desired operating characteristics, the condensers may be arranged in a series or parallel configuration. A second compressor also may be added, which second compressor may be powered by a source other than the mechanical energy of the vehicle's engine.

23 Claims, 9 Drawing Sheets

FOREIGN PATENT DOCUMENTS

| | | |
|---|---|---|
| DE | 43 24 071 | 1/1995 |
| DE | 44 14 547 | 11/1995 |
| DE | 198 38 880 | 3/2000 |
| DE | 199 17 881 | 3/2000 |
| DE | 100 65 279 | 7/2002 |
| DE | 102 24 754 | 12/2003 |
| DE | 102 42 369 | 3/2004 |
| DE | 103 48 578 | 4/2004 |

* cited by examiner

STATIONARY VEHICLE AIR CONDITIONING SYSTEM

CROSS-REFERENCE TO RELATED APPLICATIONS

This patent application claims the benefit of German Patent Application No. DE 10 2004 042 691.0, filed Sep. 1, 2004, which is hereby incorporated by reference.

FIELD OF THE INVENTION

The invention pertains to a vehicle air conditioning system and method, and more particularly, to an air conditioning system that is particularly advantageous for use with a vehicle in which the engine is not running (a "stationary vehicle"). The invention may be employed, for example, with a truck having a first air conditioner in the driver's compartment and a second air conditioner in a sleeping compartment. The air conditioning system and method includes a plurality of components that may be operated in a first mode while the engine is running and in a second mode while the engine is not running.

BACKGROUND OF THE INVENTION

German patent application DE 44 14 547 A1 describes a stationary vehicle air conditioning system in which the vehicle engine mechanically drives a first compressor and a DC electric motor powered by auxiliary vehicle batteries electrically drives a second compressor connected in parallel thereto. In normal operation, i.e., with the engine running, the first compressor circulates the refrigerant in the refrigerant circuit without the assistance of the second compressor, and, in stationary operation, i.e., with the engine off, the second compressor circulates the refrigerant without the assistance of the first compressor. The cooling of the refrigerant in each case takes place in a condenser arranged downstream of the junction of the two branches. This arrangement of components does not permit the systems to operate in an optimal manner.

Other types of stationary air conditioning systems with a cold storage unit are also known in the art, but such cooling systems typically require an undesirable charging time. There is thus a need for a stationary air conditioning system that permits the components to operate in a more optimal manner and without an undesirable charging time.

BRIEF SUMMARY OF THE INVENTION

A stationary vehicle air conditioning system with a refrigerant circuit is provided. The circuit includes at least one electrical or mechanical compressor that circulates refrigerant in the refrigerant circuit. The circuit further includes first and seconds condensers. In one embodiment, the first condenser is air cooled by a fan that is mechanically driven by the engine, e.g., through a belt connected to a rotating engine part, and the second condenser is cooled by an electrically driven fan, which is powered by a source other than the mechanical action of the engine. In this embodiment, the second condenser is thus cooled independently of the operation of the vehicle engine.

In a preferred embodiment of the invention, the second condenser may be connected in series or in parallel to the first condenser. The second condenser can be arranged in such a manner that is it constantly present in the refrigerant circuit, or, in the alternative, an appropriate arrangement of valves may selectively place or switch the second condenser into a series arrangement with the first condenser when the engine is not running. The provision of a second condenser connected in series with the first condenser permits an improved design of the two condensers for operation when the vehicle is operating in one of two modes, i.e., the engine is stopped or running. The first condenser with associated fan is designed, for instance, for normal operation with the engine running, and the second condenser with associated fan is designed, for instance, for stationary operation with the engine stopped, thereby permitting optimization of performance.

In a preferred embodiment, an electrically driven fan generates an air stream that passes through the second condenser. The fan is also preferably inactive during normal operation, so that cooling of the refrigerant is accomplished primarily by the first condenser. The second condenser may be bypassed, so that refrigerant does not flow through the second condenser in normal operation, whereby the required power for the compressor (and thus the power diverted from engine) can be reduced somewhat and/or the second condenser does not act as a refrigerant accumulator.

In an alternative embodiment, as described in more detail below, the refrigerant circuit includes a bypass around the first condenser, so that in stationary operation the flow can be directed around the first condenser, whereby the required drive power of the electric compressor can be reduced and/or the first condenser does not act as a refrigerant accumulator.

As an alternative to the series connection, the condensers may be arranged in parallel. Depending on the operating mode (normal or stationary operation) refrigerant is preferentially caused to flow through one of the condensers and the fan arranged there is driven mechanically or electrically.

Preferably a receiver is arranged downstream of each of the condensers. Excess liquid coolant can be collected in these receivers and is quickly available when needed.

In place of a mechanically driven fan at the first condenser, an electrically driven one can be provided, so that a control of fan power independent of the engine is possible, whereby the cooing performance can be optimized. Alternatively, an electrically drivable fan can also be provided in addition to the mechanical fan.

In stationary operation, power is preferably supplied to the compressor and the fan or fans via batteries, an external power source such as a line power terminal and/or an auxiliary power unit ("APU").

Preferably, particularly in case of a series connection, refrigerant can be caused to flow through both condensers at least in part, with only one of the condensers being cooled by an air stream. The other condenser in this case is cooled only during normal operation by a mechanically driven fan. This allows a simpler configuration of the refrigerant circuit and a simpler regulation thereof. Moreover, a certain cooling power is provided even if air does not flow through the first condenser.

The condenser through which there is only a partial flow in stationary operation can be set up, especially in a series connection, to act as an additional receiver for refrigerant. In this arrangement, the excess refrigerant that is not required for the lower cooling power required in stationary operation may be collected for future use. The condenser is appropriately constructed for this purpose.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
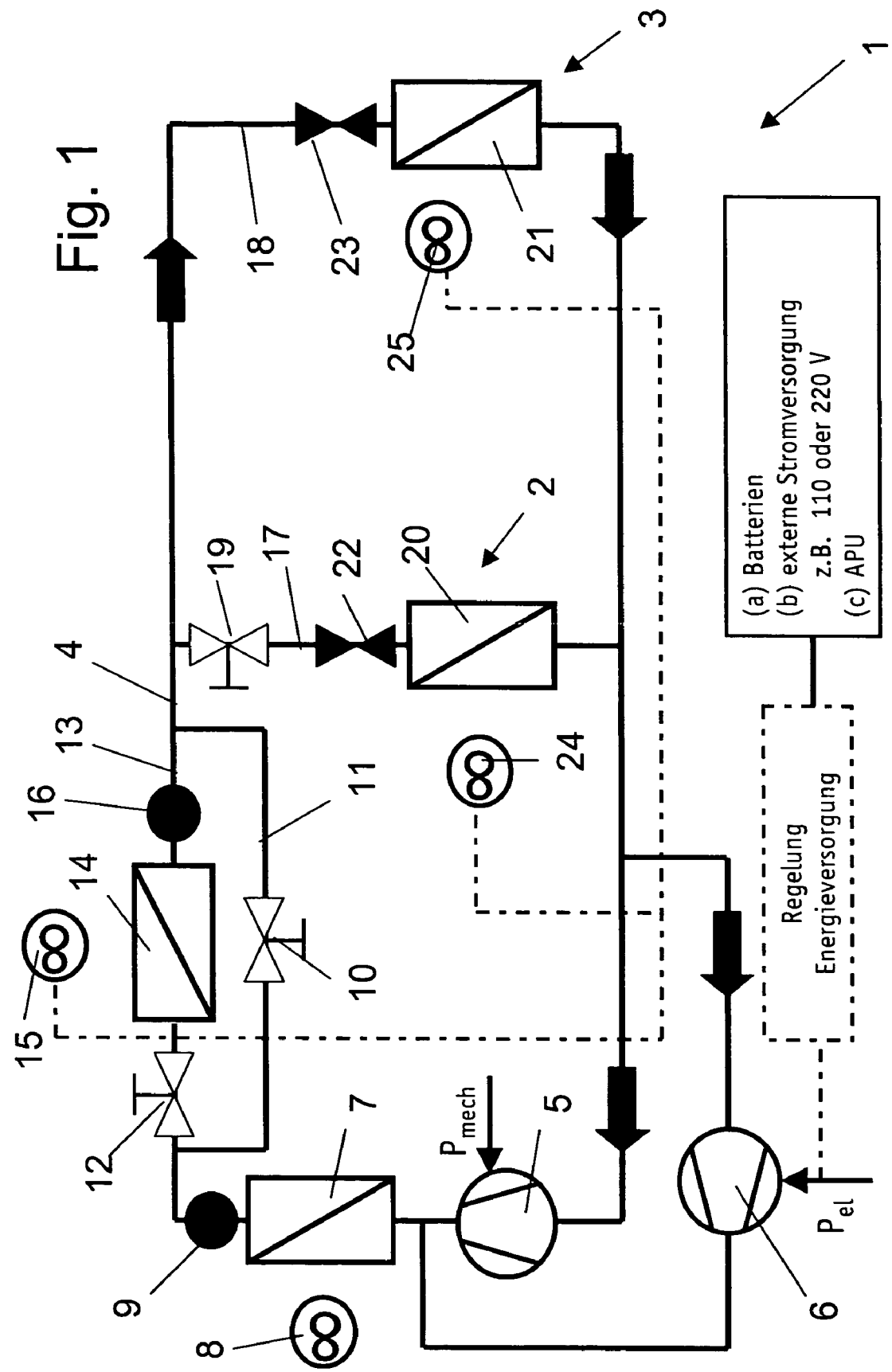
FIG. 1, a simplified representation of a refrigerant circuit according to a first embodiment.

FIG. 1 illustrates a vehicle air conditioning system 1 with a front air conditioner 2 and a rear air conditioner 3 includes a refrigerant circuit 4. A vehicle air conditioning system 1 according to the invention as in one of the embodiments described below can preferably be used in a truck with an area such as a sleeping compartment that is separate from the driver's compartment, with front air conditioner 2 being located in the driver's compartment and a rear air conditioner 3 in a separate area of the vehicle.

A belt driven first compressor 5, which is powered with the aid of the vehicle engine, circulates refrigerant through circuit 4 in normal operation while the engine is running. In stationary operation, i.e., with the motor stopped, the first compressor likewise is stopped, and a second compressor 6 is driven electrically by means of batteries or an external (AC) power source or an auxiliary power unit (APU). The electric power source is indicated in all figures with dashed lines.

In a first embodiment of the invention, as illustrated in FIG. 1, two compressors 5 and 6 are arranged in parallel branches of refrigerant circuit 4. In order to prevent backflow when second compressor 6 is not running, a check valve (not shown) is arranged in the corresponding branch of refrigerant circuit 4, downstream of second compressor 6 in the direction of refrigerant flow. A matching check valve can also be provided in the other branch downstream of first compressor 5.

The flow of refrigerant through circuit 4 in "normal" operation, i.e., with the vehicle's engine running, will be described first. Compressor 5 drives refrigerant, which is hot as a result of compression, through a first condenser 7 that is cooled by air via a first vehicle-engine driven fan 8. Condenser 7 may be further cooled by wind or by an air stream generated through the motion of the vehicle. Downstream of condenser 7, a first receiver 9 is arranged to collect and temporarily store excess liquid refrigerant. Downstream of this receiver, the circuit splits into two branches: a first branch 11 that can be closed off by a valve 10 and a second branch 13 that can be closed off by a valve 12. The arrangement of these branches creates a bypass around a second condenser 14 depending on the respective operation of values 10 and 12. An electrically driven fan 15 supplies cooling air through a second condenser 14. Similar to the first condenser, second condenser 14 includes a receiver 16.

While the vehicle's engine is running, first valve 10 is open and second valve 12 is closed, so that refrigerant flows through first branch 11. Second fan 15 is inactive in normal operation. Refrigerant circuit 4 further splits into two branches downstream of the second condenser: branches 17 and 18 are associated with air conditioners 2 and 3, respectively, with a valve 19 in branch 17 associated with front air conditioner 2 being capable of cutting off the flow of refrigerant. Before reaching a respective evaporator 20 or 21, refrigerant flows through an expansion member 22 or 23, respectively, in which refrigerant is expanded and thereby cooled. Associated with each evaporator 20 and 21 is an electrically driven fan 24 and 25, respectively, which forces air through evaporators 20 and 21, respectively, and into the respective climate control zone. After flowing through evaporators 20 and 21 the refrigerant streams are reunited and returned to first compressor 5 in normal operation.

In stationary operation, i.e., with the vehicle engine stopped, circulation of the refrigerant is accomplished primarily through the second and electrically driven compressor 6. Refrigerant flows through first condenser 7, as when the vehicle engine is running. Because the engine is stopped, however, fan 8 does not supply an air stream to cool condenser 7. Nevertheless, due to possibly lower cooling requirements in stationary mode, this arrangement may be acceptable. Based on appropriate sensors, mechanical switches, and/or electromechanical switches, valve 10 is closed, and refrigerant flows through a now correspondingly open valve 12 and condenser 14. A fan 15, which is driven with the aid of the electric power source, supplies air to cool condenser 14. Excess liquid refrigerant thereafter collects in downstream second receiver 16. Corresponding to normal operation, the refrigerant circuit splits into two branches 17 and 18, and the refrigerant flows through these branches in the manner previously described. Coolant thereafter returns to second compressor 6 due to the inactive compressor 5.

Refrigerant flowing through parallel connected evaporators and different compressors tends to accumulate in certain components during stationary operation. In particular, a parallel connected and inoperative compressor can accumulate an undesirably high amount of excess refrigerant, which can in turn lead to a drop in cooling power and, under certain circumstances, to a failure of the compressors. This failure mode may be caused, at least in part, by the fact that the same amount of refrigerant exists in both the stationary and engine-running modes of operation. Because a smaller amount of refrigerant is typically required in stationary mode, due to the lower cooling needs, it may be necessary to take further appropriate measures to reduce the amount of refrigerant during stationary operation. This may be accomplished, for example, by drawing off a predetermined amount of refrigerant via a bypass (not shown) and temporarily storing this refrigerant in an accumulator (not shown) during stationary operation. After normal operation is resumed, the stored refrigerant may be pumped back into the refrigerant circuit.

In an alternative to the foregoing embodiment, the second compressor 6 may be operated intermittently rather than continuously. According to another alternative, a refrigerant receiver with variable capacity is provided, and an expansion member may be integrated into a receiver and dryer unit, so that corresponding combinations are provided in place of the two expansion members of the first embodiment. As yet an additional alternative, the refrigerant circuit includes a bypass with an ice accumulator into which the excess (cold) refrigerant is directed, thereby permitting the refrigerant to be cooled and stored during stationary operation. In addition, at least part of the condenser through which cooling air does not flow in stationary operation can provide interim storage of the excess refrigerant.

Figure 2:
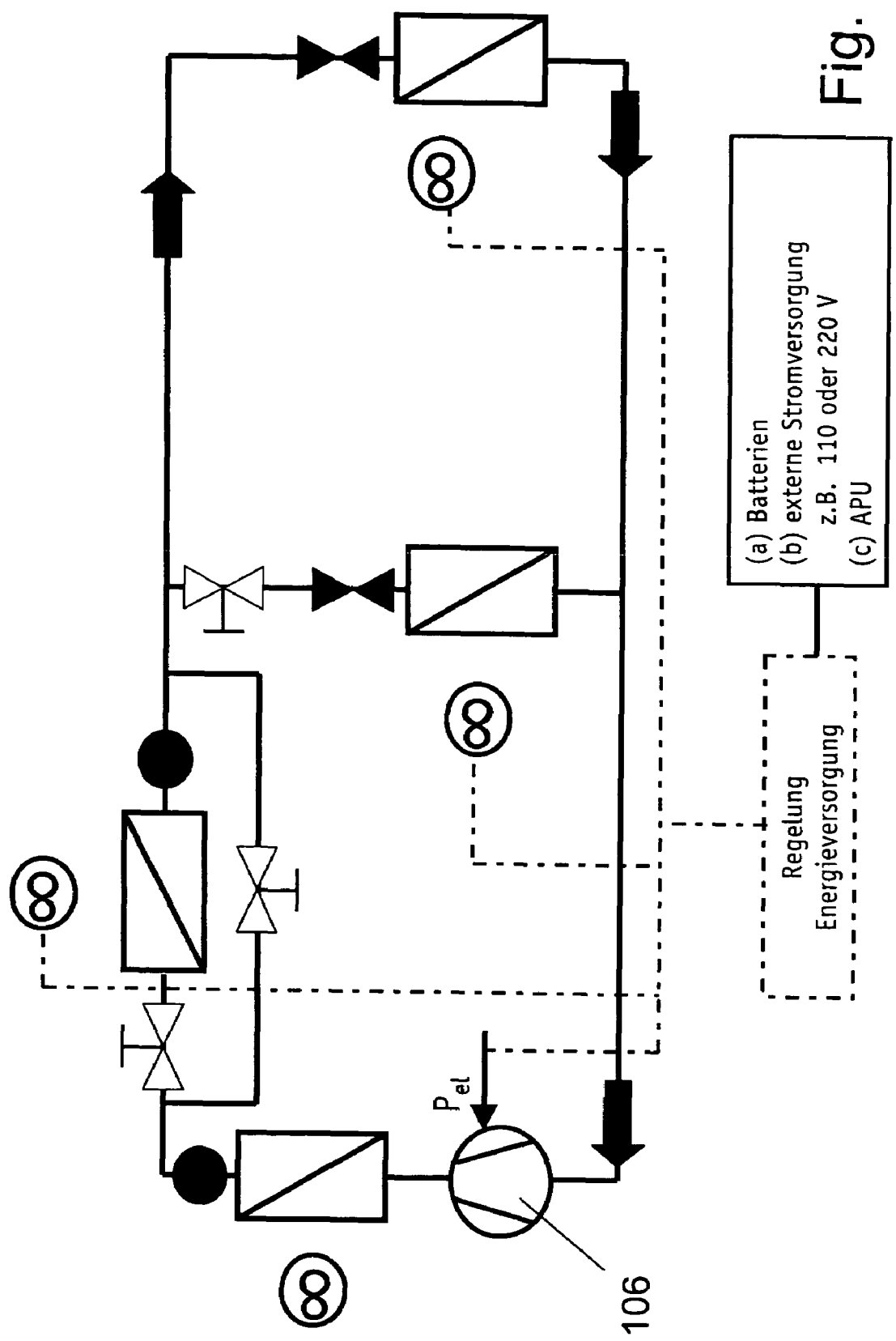
FIG. 2, a simplified representation of a refrigerant circuit according to a second embodiment.

FIG. 2 illustrates a second embodiment. In this embodiment, only a single electrically driven compressor 106 circulates coolant both in normal operation and as needed in stationary operation. This single compressor replaces the parallel branches with mechanically driven compressor 5 and electrically driven compressor 6 of FIG. 1. The circuit thereafter operates as described above.

Figure 3:
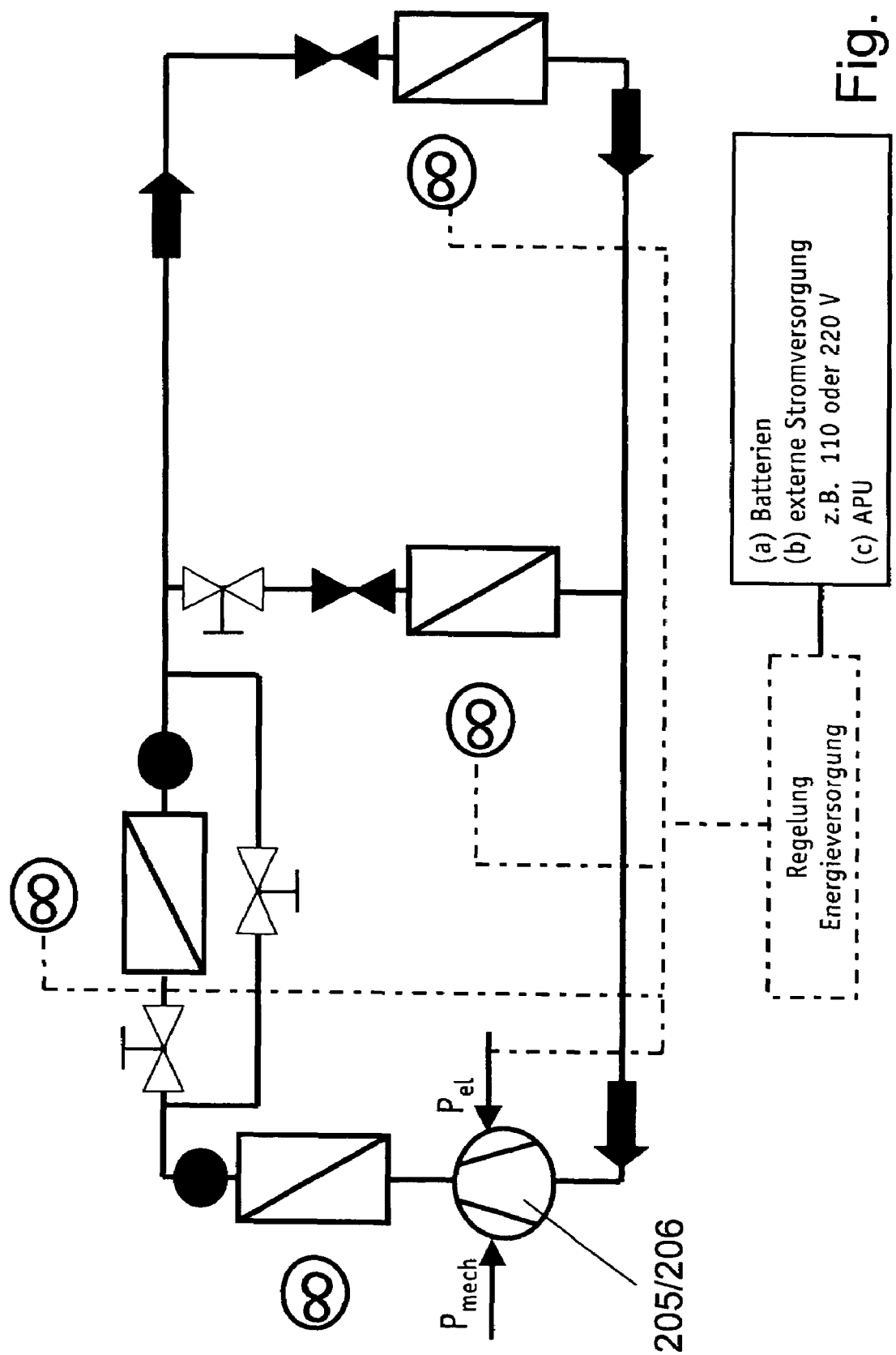
FIG. 3, a simplified representation of a refrigerant circuit according to a third embodiment.

FIG. 3 illustrates yet another embodiment in which a hybrid compressor 205/206, which can be driven both mechanically by the engine and electrically, may be substituted for the single electrical compressor of FIG. 2. In normal operation, the running vehicle engine drives hybrid compressor 205/206, and, in stationary operation, an electrical source (such as batteries, an external power source or an APU) supplies power to compressor 205/206. In other respects, this embodiment is similar to the prior embodiments.

Figure 4:
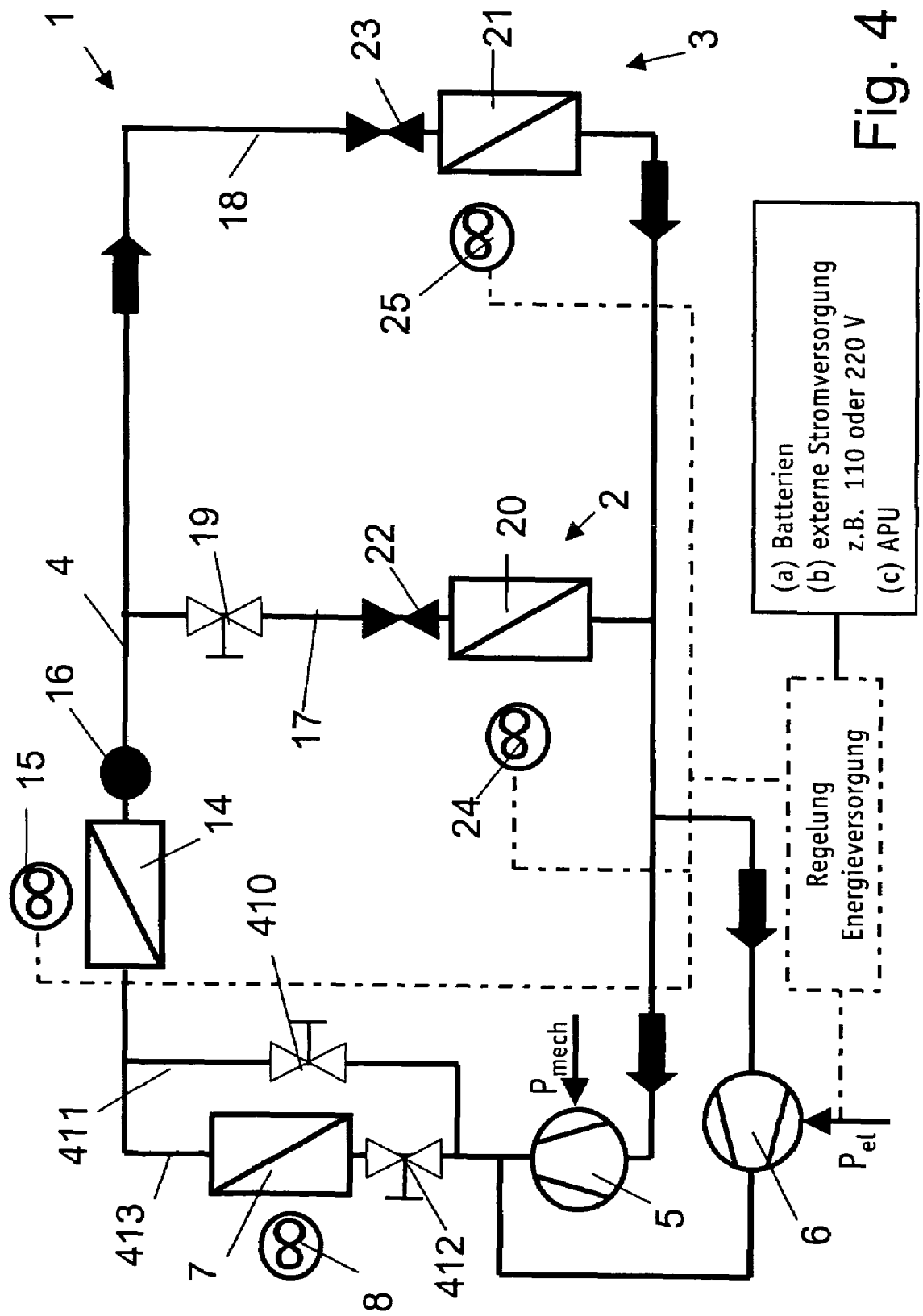
FIG. 4, a simplified representation of a refrigerant circuit according to a fourth embodiment.

A fourth embodiment of the invention is illustrated in FIG. 4. In this embodiment, the circuit 4 splits into two branches downstream of the junction of compressors 5 and 6. A first branch 411 can be closed off by a first valve 410, thereby forming a bypass to the second branch 413, which can be closed off by a second valve 412. In normal operation, first valve 410 is closed and second valve 412 is open, so that refrigerant flows through second branch 413 and thus through condenser 7, and, subsequently, through condenser 14.

In contrast to the first embodiment, the refrigerant circuit in FIG. 4 does not include a bypass for second condenser 14. Furthermore, receiver 16 is only arranged downstream of second condenser 14. Electrically driven fan 15 supplies cooling air receiver 16, but no air is needed nor supplied to a second receiver, such as receiver 9 in the embodiment of FIG. 1.

By reference to FIG. 4, the flow of refrigerant during normal operation will now be described. First compressor 5 supplies refrigerant, which is hot due to compression, through a first condenser 7 that is air-cooled. The open position of second valve 412 and closed position of first valve 410 forces refrigerant through branch 413. A first fan 8 supplies cooling air to condenser 7 with the aid of the vehicle engine. Cooling also takes place due to relative wind or air flows generated through the movement of the vehicle. Subsequently, the cooled refrigerant flows through second condenser 14, with electrically driven fan 15 inactive, and through receiver 16.

In stationary operation, electrically driven compressor 6 causes refrigerant to flow through the circuit 4. Due to the opened first valve 410 and closed second valve 412, refrigerant flows through the bypass branch 411 and around first condenser 7. First fan 8 is shut off due to the inactive engine, and therefore supplies no cooling air stream. Refrigerant thereafter flows through second condenser 14 in which the refrigerant is cooled via second fan 15, which is driven with the aid of the electric power supply. Excess refrigerant accumulates in downstream receiver 16. Corresponding to normal operation, there is subsequently a distribution of the refrigerant to the two branches 17 and 18.

Figure 5:
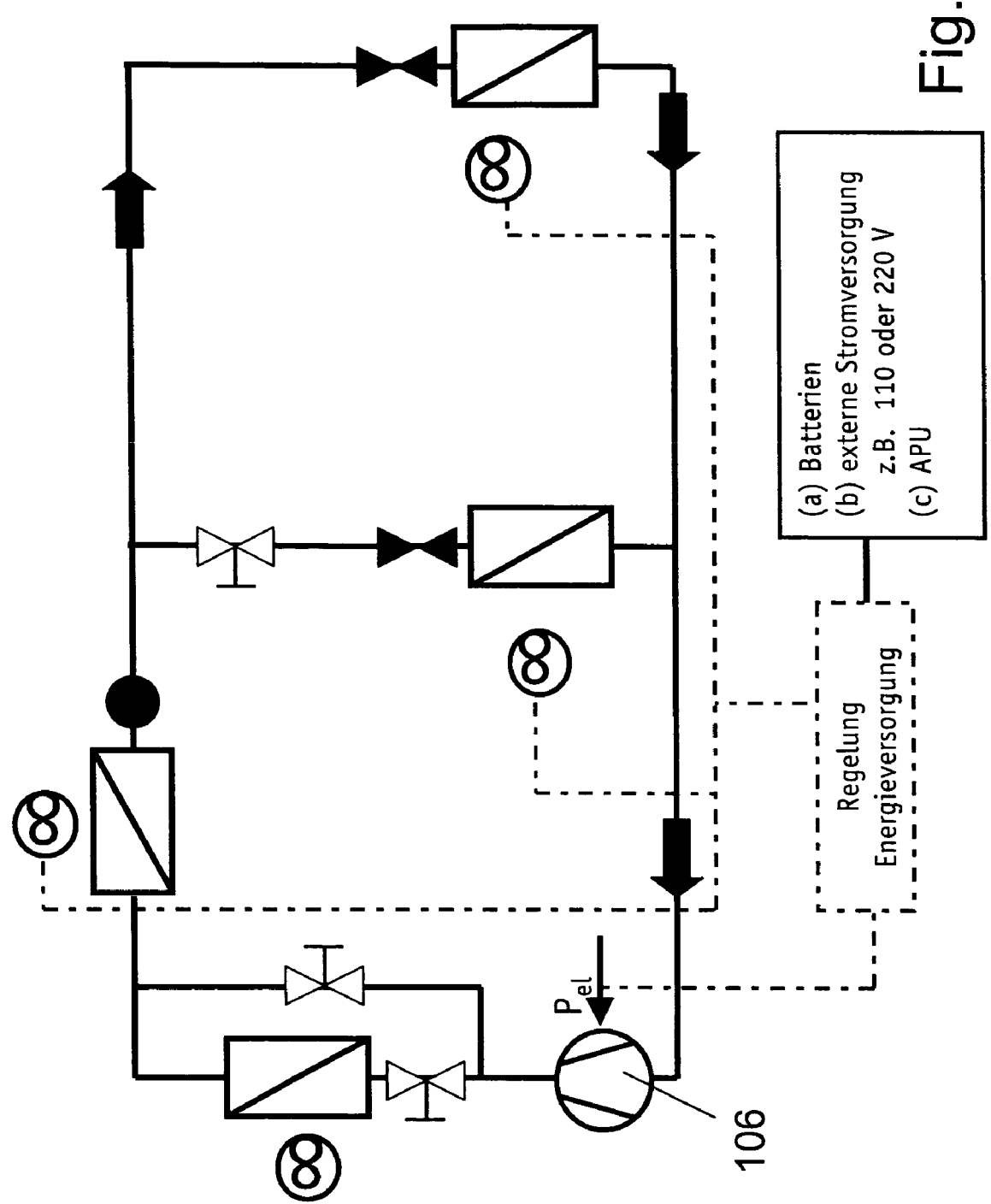
FIG. 5, a simplified representation of a refrigerant circuit according to a fifth embodiment.
Figure 6:
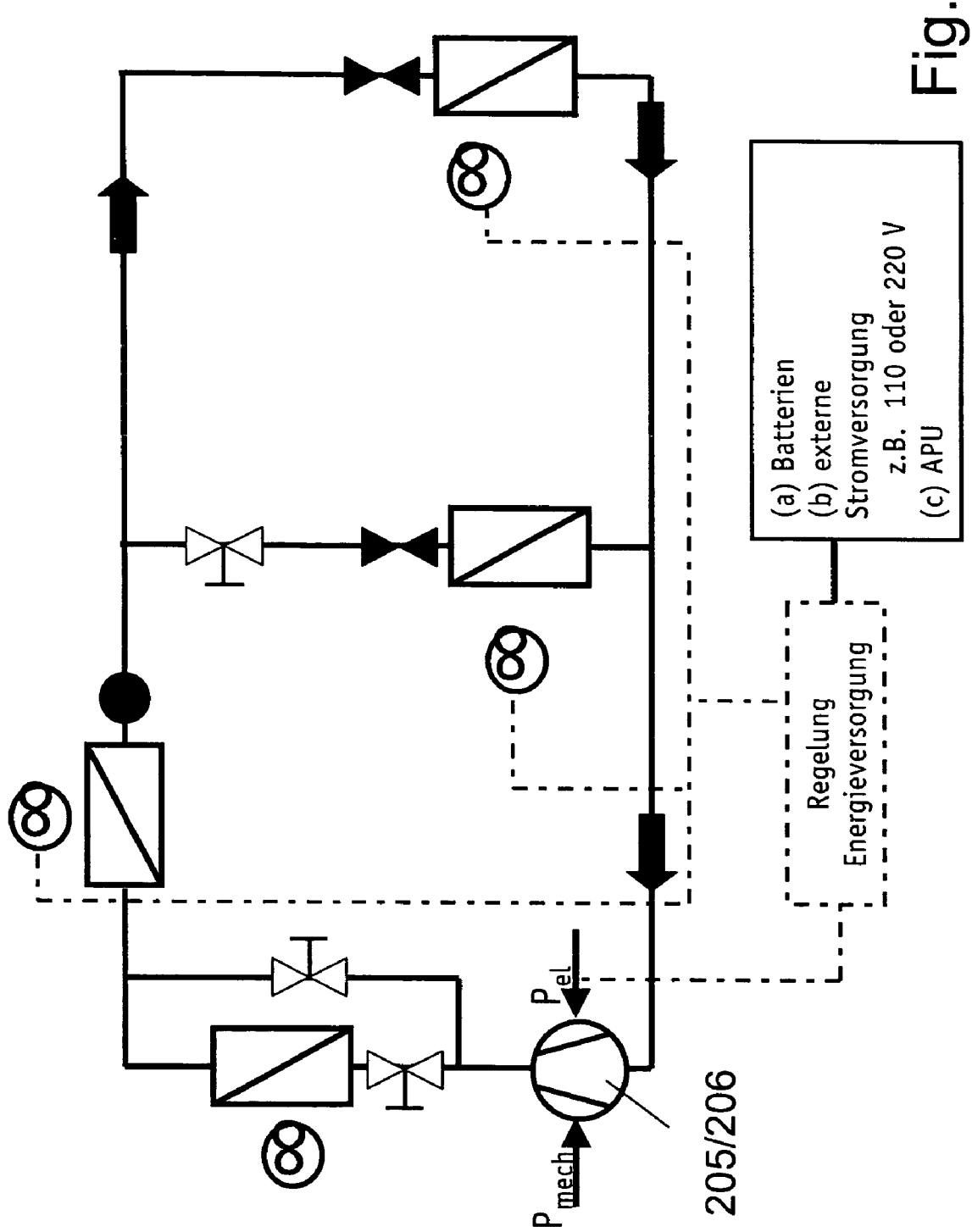
FIG. 6, a simplified representation of a refrigerant circuit according to a sixth embodiment.

FIG. 5 illustrates a fifth embodiment in which only one electrically driven compressor 106 circulates refrigerant both in normal operation and, as needed, in stationary operation. This embodiment is thus similar in certain respects to the embodiment of FIG. 2 in that a single compressor and branch replaces mechanically driven compressor 5 and electrically driven compressor 6. Likewise, FIG. 6 illustrates a similar embodiment in which a hybrid compressor 205/206, which can be driven both mechanically by the engine and electrically, replaces the single electrically driven compressor 106 of FIG. 5. In regard to normal and standard operation in other respects, the reader is referred to the description of the prior embodiments.

Figure 7:
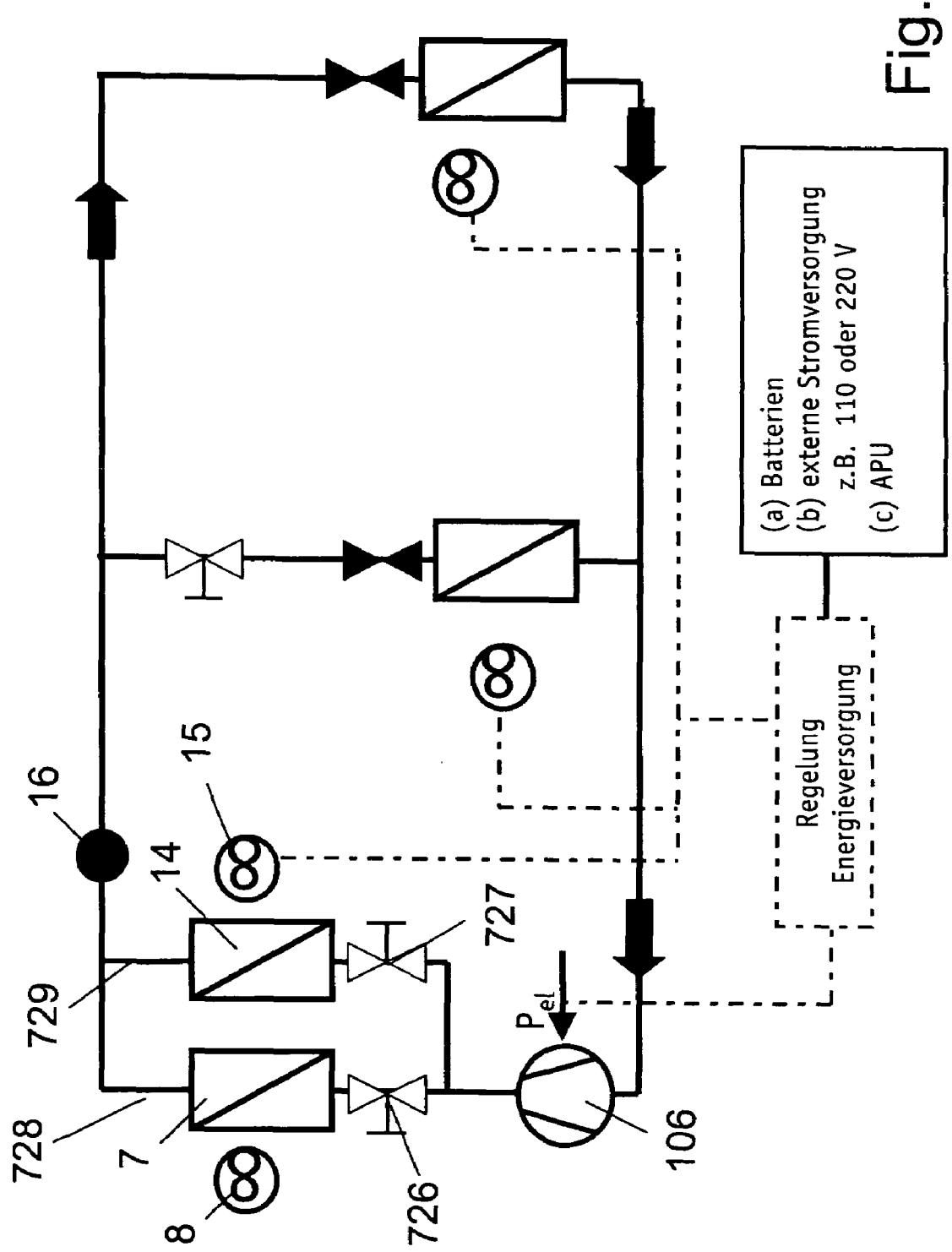
FIG. 7, a simplified representation of a refrigerant circuit according to a seventh embodiment.

FIG. 7 illustrates yet another embodiment. In this embodiment, electrical compressor 106 circulates refrigerant to the two condensers 7 and 14 that are connected to the refrigerant circuit in parallel. A first valve 726 arranged upstream of the first condenser 7 and a second valve 727 arranged upstream of the second condenser permit the selective operation of one or both of condensers 7 and 14. A receiver 16 is positioned downstream of the junction of parallel branches 728 and 729. The remaining configuration of refrigerant circuit 4 corresponds to that of the previously described embodiments.

Figure 8:
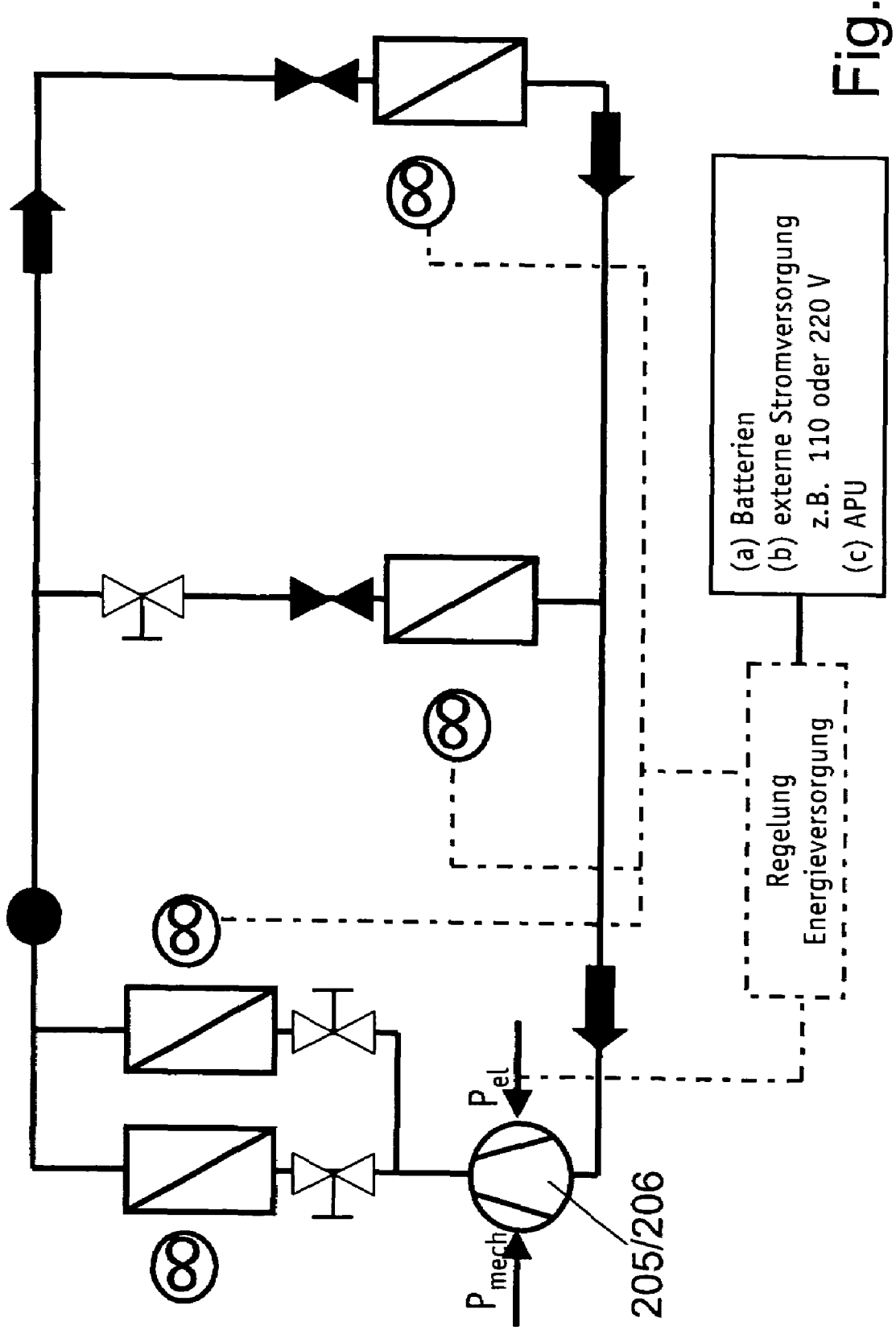
FIG. 8, a simplified representation of a refrigerant circuit according to a eighth embodiment.

In normal operation, the refrigerant in the embodiment illustrated in FIG. 7 is circulated by electrical compressor 106 and, because of open first valve 726 and closed second valve 727, it flows through first branch 728, in which first condenser 7 is arranged. Fan 8, driven by the running engine, supplies cooling air to condenser 7, whereas electrically driven fan 15 for second condenser 14 remains inactive. Subsequently the refrigerant flows through a receiver 16. In stationary operation, first valve 726 is closed and second valve 727 is opened such that refrigerant flows only through second condenser 14. In this case, electrically driven fan 15 supplies air to flow through the second condenser 14, while mechanically drivable first fan 8 is inactive. The refrigerant subsequently flows through receiver 16. FIG. 8 operates similarly to FIG. 7, with the exception of a hybrid compressor 205/206 that is provided in place of electrical compressor 106 of the seventh embodiment.

Figure 9:
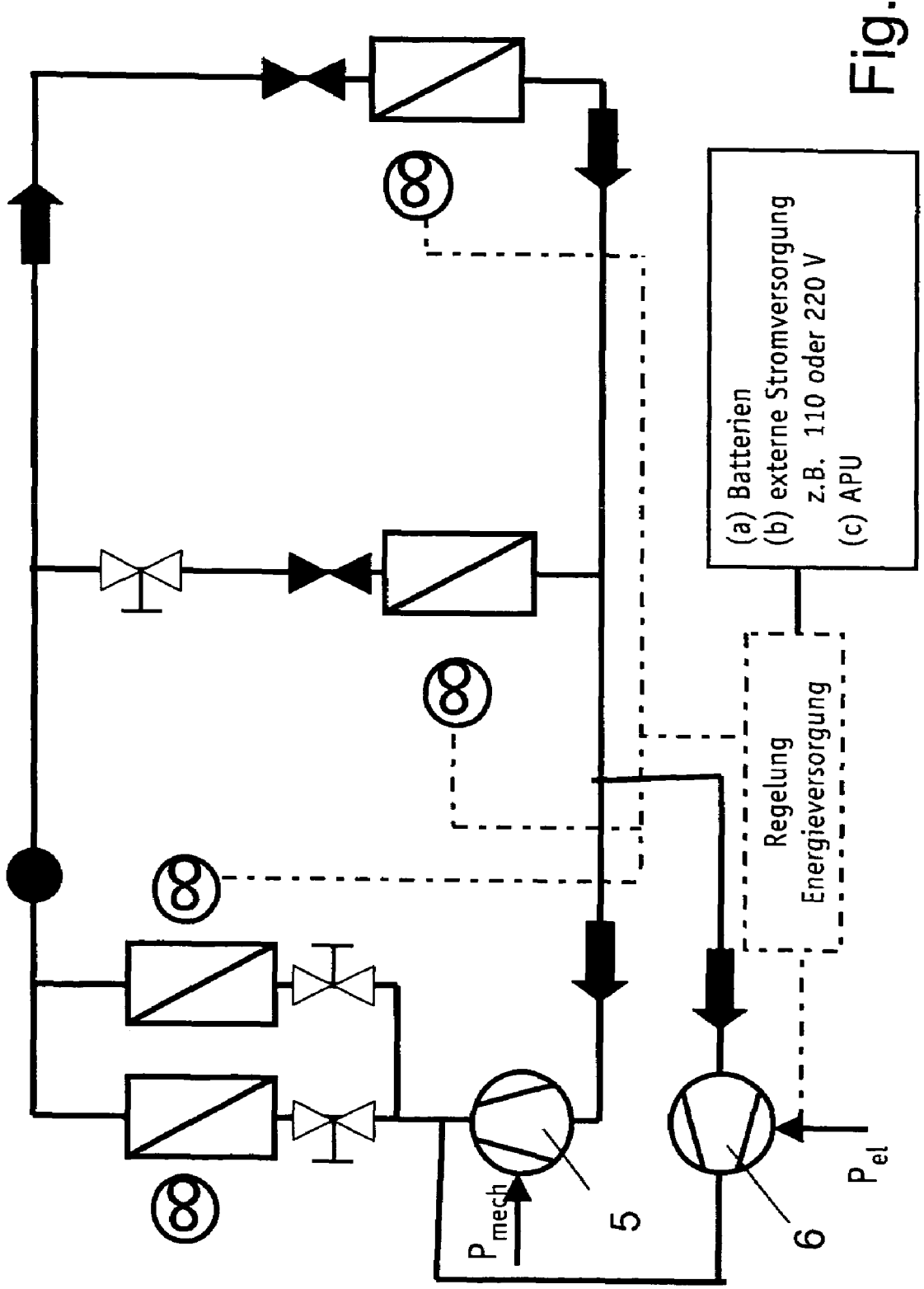
FIG. 9, a simplified representation of a refrigerant circuit according to a ninth embodiment.

FIG. 9 illustrates a ninth embodiment of the invention. As in the first embodiment, a parallel connection of a mechanically driven compressor 5 and an electrically driven compressor 6 is provided in place of electrical compressor 106 of the seventh embodiment. Otherwise, the ninth embodiment agrees with the seventh embodiment.

While this invention has been described with an emphasis upon particular embodiments, it should be understood that the foregoing description has been limited to the presently contemplated best modes for practicing the invention. It will be apparent that further modifications may be made to the invention, and that some or all of the advantages of the invention may be obtained. Also, the invention is not intended to require each of the above-described features and aspects or combinations thereof. In many instances, certain features and aspects are not essential for practicing other features and aspects. The invention should only be limited by the appended claims and equivalents thereof, since the claims are intended to cover other variations and modifications even though not within their literal scope.

What is claimed is:

1. An air conditioning system for use in a vehicle and having air conditioning elements positioned within a refrigeration circuit, the air conditioning system comprising a selectively operable first compressor, a first condenser positioned downstream of the first compressor, a second condenser positioned downstream of the first compressor, a first selectively operable valve between the first condenser and the second condenser, a mechanically driven fan positioned to pass air through the first condenser, and an evaporator positioned downstream of the first condenser and the second condenser; wherein the refrigeration circuit includes a bypass around the second condenser, the bypass including a second selectively operable valve, and being positioned upstream of the evaporator, wherein the first and second valves can be opened and closed to allow or prevent refrigerant flow through the second condenser and the bypass.

2. The air conditioning system of claim 1, wherein the air conditioning system operates in a first operating mode when a mechanically linked vehicle engine is running and a second operating mode when the engine is stopped.

3. The air conditioning system of claim 2, wherein the first condenser is selectively coupled to the first compressor.

4. The air conditioning system of claim 3, wherein the first condenser is not coupled to the first compressor in the second operating mode.

5. The air conditioning system of claim 2, wherein the first condenser is selectively coupled to the second condenser.

6. The air conditioning system of claim 5, wherein the first condenser is coupled in series to the second condenser in the first operating mode.

7. The air conditioning system of claim 5, wherein the first condenser is coupled in series to the second condenser in the second operating mode.

8. The air conditioning system of claim 5, wherein the first condenser is not coupled to the second condenser in the first operating mode and wherein the second condenser is coupled in series to the first condenser in the second operating mode.

9. The air conditioning system of claim 5, wherein the first condenser is not coupled to the second condenser in either the first or second operating modes.

10. The air conditioning system of claim 2, further comprising a selectively operable second compressor.

11. The air conditioning system of claim 10, wherein the first condenser is selectively coupled to the second compressor.

12. The air conditioning system of claim 10, wherein the second condenser is selectively coupled to the first condenser.

13. The air conditioning system of claim 10, wherein the first condenser is not coupled to the second condenser in the first operating mode and wherein the second condenser is coupled in series to the first condenser in the second operating mode.

14. The air conditioning system of claim 10, wherein the first condenser is coupled in series to the second condenser in the first operating mode and wherein the second condenser is not coupled to the first condenser in the second operating mode.

15. The air conditioning system of claim 2, further comprising an electrically driven fan positioned to pass air through the second condenser.

16. The air conditioning system of claim 15, wherein the electrically driven fan operates does not operate simultaneously with the mechanically driven fan.

17. The air conditioning system of claim 10, wherein the second condenser is selectively coupled to the second compressor and wherein refrigerant may bypass the first condenser.

18. The air conditioning system of claim 2, wherein the second condenser is selectively coupled to the first condenser in a parallel arrangement.

19. The air conditioning system of claim 2, further comprising a receiver positioned downstream of the first condenser.

20. The air conditioning system of claim 19, further comprising a receiver positioned downstream of the second condenser.

21. The air conditioning system of claim 2, further comprising an external electric power source.

22. The air conditioning system of claim 21, wherein the external electric power source is comprised of batteries.

23. The air conditioning system of claim 21, wherein the external electric power source is comprised of a gasoline-powered generator.

* * * * *